US011450068B2

(12) United States Patent
Li et al.

(10) Patent No.: US 11,450,068 B2
(45) Date of Patent: Sep. 20, 2022

(54) METHOD AND DEVICE FOR PROCESSING IMAGE, AND STORAGE MEDIUM USING 3D MODEL, 2D COORDINATES, AND MORPHING PARAMETER

(71) Applicant: BEIJING SENSETIME TECHNOLOGY DEVELOPMENT CO., LTD., Beijing (CN)

(72) Inventors: Tong Li, Beijing (CN); Wentao Liu, Beijing (CN); Chen Qian, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/131,879

(22) Filed: Dec. 23, 2020

(65) Prior Publication Data

US 2021/0158616 A1 May 27, 2021

Related U.S. Application Data

(63) Continuation of application No. PCT/CN2020/086695, filed on Apr. 24, 2020.

(30) Foreign Application Priority Data

Nov. 21, 2019 (CN) ........................ 201911148068.3

(51) Int. Cl.
*G06T 17/20* (2006.01)
*G06T 15/04* (2011.01)
(Continued)

(52) U.S. Cl.
CPC ............ *G06T 17/205* (2013.01); *G06T 13/40* (2013.01); *G06T 15/04* (2013.01); *G06T 17/10* (2013.01);
(Continued)

(58) Field of Classification Search
CPC ....... G06T 17/205; G06T 17/10; G06T 15/04; G06T 19/20; G06T 2219/2021; G06T 2210/44; G06T 13/40
See application file for complete search history.

(56) References Cited

U.S. PATENT DOCUMENTS

2003/0174286 A1* 9/2003 Trumbull ............ G11B 27/022
352/243
2010/0134487 A1 6/2010 Lai
(Continued)

FOREIGN PATENT DOCUMENTS

CN 105938627 A 9/2016
CN 108765273 A 11/2018
(Continued)

OTHER PUBLICATIONS

Jain, Arjun, et al. "Moviereshape: Tracking and reshaping of humans in videos." ACM Transactions on Graphics (TOG) 29.6 (2010): 1-10. (Year: 2010).*

(Continued)

*Primary Examiner* — Daniel F Hajnik
(74) *Attorney, Agent, or Firm* — Cooper Legal Group, LLC

(57) ABSTRACT

A first three-dimensional (3D) model of a target in a 3D space is acquired based on a first two-dimensional (2D) image including the target. A 3D morphing parameter is acquired. The first 3D model is transformed into a second 3D model based on the 3D morphing parameter. First 2D coordinates are acquired by mapping the first 3D model to a 2D space. Second 2D coordinates are acquired by mapping the second 3D model to the 2D space. A second 2D image including a morphed target is acquired by morphing the target in the first 2D image based on the first 2D coordinates and the second 2D coordinates.

15 Claims, 13 Drawing Sheets

S110, a first three-dimensional (3D) model of a target in a 3D space is acquired based on a first two-dimensional (2D) image including the target S120, a 3D morphing parameter is acquired. The first 3D model is transformed into a second 3D model based on the 3D morphing parameter S130, first 2D coordinates are acquired by mapping the first 3D model to a 2D space. Second 2D coordinates are acquired by mapping the second 3D model to the 2D space S140, a second 2D image including a morphed target is acquired by morphing the target in the first 2D image based on the first 2D coordinates and the second 2D coordinates

(51) Int. Cl.
*G06T 19/20* (2011.01)
*G06T 13/40* (2011.01)
*G06T 17/10* (2006.01)

(52) U.S. Cl.
CPC .......... *G06T 19/20* (2013.01); *G06T 2210/44* (2013.01); *G06T 2219/2021* (2013.01)

(56) References Cited

U.S. PATENT DOCUMENTS

| | | | |
|---|---|---|---|
| 2011/0064331 | A1 | 3/2011 | Andres Del Valle |
| 2016/0210500 | A1 | 7/2016 | Feng et al. |

FOREIGN PATENT DOCUMENTS

| | | | |
|---|---|---|---|
| CN | 108765351 | A | 11/2018 |
| CN | 109146769 | A | 1/2019 |
| CN | 109584168 | A | 4/2019 |
| CN | 109685915 | A | 4/2019 |
| CN | 109934766 | A | 6/2019 |
| CN | 110335343 | A | 10/2019 |
| CN | 111031305 | A | 4/2020 |
| JP | H0950540 | A | 2/1997 |
| JP | H10240908 | A | 9/1998 |
| JP | H11175765 | A | 7/1999 |
| JP | 2003085588 | A | 3/2003 |
| JP | 6013669 | B1 | 10/2016 |
| JP | 6116784 | B1 | 4/2017 |
| JP | 2018129009 | A | 8/2018 |
| TW | 200823689 | A | 6/2008 |

OTHER PUBLICATIONS

Kanazawa, Angjoo, et al. "End-to-end Recovery of Human Shape and Pose." arXiv preprint arXiv:1712.06584 (2018). (Year: 2018).*

Zhou, Shizhe, et al. "Parametric reshaping of human bodies in images." ACM transactions on graphics (TOG) 29.4 (2010): 1-10. (Year: 2010).*

Kolotouros, Nikos, Georgios Pavlakos, and Kostas Daniilidis. "Convolutional Mesh Regression for Single-Image Human Shape Reconstruction." arXiv preprint arXiv:1905.03244 (May 2019). (Year: 2019).*

Shimshoni, Ilan, Ronen Bash, and Ehud Rivlin. "A geometric interpretation of weak-perspective motion." IEEE Transactions on pattern analysis and machine intelligence 21.3 (1999): 252-257. (Year: 1999).*

International Search Report in the international application No. PCT/CN2020/086695, dated Aug. 20, 2020, 3 pgs.

First Office Action of the Chinese application No. 201911148068.3, dated Mar. 2, 2021, 21 pgs.

First Office Action of the Japanese application No. 2020-570014, dated Feb. 22, 2022, 8 pgs.

* cited by examiner

METHOD AND DEVICE FOR PROCESSING IMAGE, AND STORAGE MEDIUM USING 3D MODEL, 2D COORDINATES, AND MORPHING PARAMETER

CROSS-REFERENCE TO RELATED APPLICATIONS

This application is a U.S. continuation application of International Application No. PCT/CN2020/086695, filed on Apr. 24, 2020, which claims priority to Chinese Application No. 201911148068.3, filed on Nov. 21, 2019. The disclosures of International Application No. PCT/CN2020/086695 and Chinese Application No. 201911148068.3 are hereby incorporated by reference in their entireties.

TECHNICAL FIELD

The subject disclosure relates to the field of image processing, and more particularly, to a method and device for processing an image, and a storage medium.

BACKGROUND

A collected image may include an image of a to-be-collected object (target). An image effect of the image may have to be adjusted by morphing the target, such as through body contouring and face cosmetology. However, in some cases, an effect of image morphing may not be satisfactory, even rendering unnecessary morphing other than the expected morphing.

SUMMARY

Embodiments herein provide a method and device for processing an image, and a storage medium.

A technical solution herein is implemented as follows.

According to a first aspect herein, a method for processing an image includes:

acquiring a first three-dimensional (3D) model of a target in a 3D space based on a first two-dimensional (2D) image including the target;

acquiring a 3D morphing parameter, and transforming the first 3D model into a second 3D model based on the 3D morphing parameter;

acquiring first 2D coordinates by mapping the first 3D model to a 2D space, and acquiring second 2D coordinates by mapping the second 3D model to the 2D space; and acquiring a second 2D image including a morphed target by morphing the target in the first 2D image based on the first 2D coordinates and the second 2D coordinates.

In some optional embodiments herein, acquiring the first 3D model of the target in the 3D space based on the first 2D image including the target may include:

extracting, from the first 2D image through a Human Mesh Recovery (HMR) model, a first reconstruction parameter for reconstructing a 3D model of the target; and reconstructing the first 3D model of the target in the 3D space using the first reconstruction parameter as extracted.

In some optional embodiments herein, the first reconstruction parameter may include at least one of first joint point parameters of the target, a first morphological parameter of the target, or a camera parameter of the first 2D image.

In some optional embodiments herein, the method may further include: extracting second joint point parameters of the target from the first 2D image through a human detection model. Second joint points represented by the second joint point parameters may coincide with a part of first joint points represented by the first joint point parameters.

Reconstructing the first 3D model of the target in the 3D space using the first reconstruction parameter as extracted may include:

forming a second reconstruction parameter by replacing, with the second joint point parameters, first joint point parameters of the part of the first joint points coinciding with the second joint points in the first reconstruction parameter; and reconstructing the first 3D model of the target in the 3D space based on the second reconstruction parameter.

In some optional embodiments herein, acquiring the first 2D coordinates by mapping the first 3D model to the 2D space, and acquiring the second 2D coordinates by mapping the second 3D model to the 2D space may include:

acquiring the first 2D coordinates and the second 2D coordinates by mapping the first 3D model and the second 3D model respectively to the 2D space according to a camera parameter corresponding to the first 2D image.

In some optional embodiments herein, the method may further include: acquiring a first 2D morphing parameter of the first 2D image.

Acquiring the 3D morphing parameter may include:

acquiring the 3D morphing parameter according to the first 2D morphing parameter and a mapping relation between the 2D space and the 3D space.

In some optional embodiments herein, the method may further include:

acquiring a contour point parameter of the target in the first 2D image; and determining, based on the contour point parameter, a connection relation between at least two contour points, as well as a morphing direction represented by the connection relation.

Acquiring the second 2D image including the morphed target by morphing the target in the first 2D image based on the first 2D coordinates and the second 2D coordinates may include:

acquiring the second 2D image including the morphed target by morphing the target in the first 2D image along the morphing direction based on the first 2D coordinates and the second 2D coordinates.

In some optional embodiments herein, determining, based on the contour point parameter, the connection relation between the at least two contour points, as well as the morphing direction represented by the connection relation may include: determining the morphing direction according to a first connection direction of contour points of at least two symmetrically distributed parts in the target based on the contour point parameter.

The morphing direction may include at least one of a first morphing direction parallel to the first connection direction or a second morphing direction perpendicular to the first connection direction.

In some optional embodiments herein, determining, based on the contour point parameter, the connection relation between the at least two contour points, as well as the morphing direction represented by the connection relation may include: determining the morphing direction according to a second connection direction of at least two contour points symmetrically distributed about a central point or a centerline of a predetermined part in the target based on the contour point parameter.

The morphing direction may include a third morphing direction parallel to the second connection direction and/or a fourth morphing direction perpendicular to the second connection direction.

In some optional embodiments herein, acquiring the second 2D image including the morphed target by morphing the target in the first 2D image based on the first 2D coordinates and the second 2D coordinates may include:

determining a second 2D morphing parameter for moving from the first 2D coordinates to the second 2D coordinates along a morphing direction; and acquiring the second 2D image including the morphed target by morphing the target in the first 2D image based on the second 2D morphing parameter.

In some optional embodiments herein, transforming the first 3D model into the second 3D model based on the 3D morphing parameter may include:

acquiring the second 3D model by changing coordinates of at least part of contour points of the first 3D model based on the 3D morphing parameter.

According to a second aspect herein, a device for processing an image includes a first acquiring module, a second acquiring module, a mapping module, and a morphing module.

The first acquiring module is configured for acquiring a first three-dimensional (3D) model of a target in a 3D space based on a first two-dimensional (2D) image including the target.

The second acquiring module is configured for acquiring a 3D morphing parameter, and transforming the first 3D model into a second 3D model based on the 3D morphing parameter.

The mapping module is configured for acquiring first 2D coordinates by mapping the first 3D model to a 2D space, and acquiring second 2D coordinates by mapping the second 3D model to the 2D space.

The morphing module is configured for acquiring a second 2D image including a morphed target by morphing the target in the first 2D image based on the first 2D coordinates and the second 2D coordinates.

In some optional embodiments herein, the first acquiring module may be configured for:

extracting, from the first 2D image through a Human Mesh Recovery (HMR) model, a first reconstruction parameter for reconstructing a 3D model of the target; and reconstructing the first 3D model of the target in the 3D space using the first reconstruction parameter as extracted.

In some optional embodiments herein, the first reconstruction parameter may include at least one of first joint point parameters of the target, a first morphological parameter of the target, or a camera parameter of the first 2D image.

In some optional embodiments herein, the device may further include an extracting module. The extracting module may be configured for extracting second joint point parameters of the target from the first 2D image through a human detection model.

Second joint points represented by the second joint point parameters may coincide with a part of first joint points represented by the first joint point parameters.

The first acquiring module may be configured for:

forming a second reconstruction parameter by replacing, with the second joint point parameters, first joint point parameters of the part of the first joint points coinciding with the second joint points in the first reconstruction parameter; and reconstructing the first 3D model of the target in the 3D space based on the second reconstruction parameter.

In some optional embodiments herein, the mapping module may be configured for acquiring the first 2D coordinates and the second 2D coordinates by mapping the first 3D model and the second 3D model respectively to the 2D space according to a camera parameter corresponding to the first 2D image.

In some optional embodiments herein, the device may further include a third acquiring module configured for acquiring a first 2D morphing parameter of the first 2D image.

The second acquiring module may be configured for acquiring the 3D morphing parameter according to the first 2D morphing parameter and a mapping relation between the 2D space and the 3D space.

In some optional embodiments herein, the device may further include a fourth acquiring module and a determining module.

The fourth acquiring module may be configured for acquiring a contour point parameter of the target in the first 2D image.

The determining module may be configured for determining, based on the contour point parameter, a connection relation between at least two contour points, as well as a morphing direction represented by the connection relation.

The morphing module may be configured for acquiring the second 2D image including the morphed target by morphing the target in the first 2D image along the morphing direction based on the first 2D coordinates and the second 2D coordinates.

In some optional embodiments herein, the determining module may be configured for determining the morphing direction according to a first connection direction of contour points of at least two symmetrically distributed parts in the target based on the contour point parameter. The morphing direction may include at least one of a first morphing direction parallel to the first connection direction or a second morphing direction perpendicular to the first connection direction.

In some optional embodiments herein, the determining module may be configured for determining the morphing direction according to a second connection direction of at least two contour points symmetrically distributed about a central point or a centerline of a predetermined part in the target based on the contour point parameter. The morphing direction may include a third morphing direction parallel to the second connection direction and/or a fourth morphing direction perpendicular to the second connection direction.

In some optional embodiments herein, the morphing module may be configured for:

determining a second 2D morphing parameter for moving from the first 2D coordinates to the second 2D coordinates along a morphing direction; and acquiring the second 2D image including the morphed target by morphing the target in the first 2D image based on the second 2D morphing parameter.

In some optional embodiments herein, the second acquiring module may be configured for acquiring the second 3D model by changing coordinates of at least part of contour points of the first 3D model based on the 3D morphing parameter.

According to a third aspect herein, a device for processing an image includes memory and a processor connected to the memory.

The memory is configured for storing computer-executable instructions.

The processor is configured for implementing a method for processing an image according to any technical solution herein.

According to a fourth aspect herein, a computer storage medium has stored thereon computer-executable instructions which, when executed by a processor, implement a method for processing an image according to any technical solution herein.

With a technical solution provided herein, when a target in a first 2D image is morphed, the target may be morphed not by directly morphing the image in a 2D plane, but by transforming the target in the first 2D image into the first 3D model in the 3D space. The target may be morphed by directly morphing the first 3D model by acquiring a 3D morphing parameter, acquiring the morphed second 3D model, then mapping the first 3D model and the second 3D model respectively to the 2D space to acquire first 2D coordinates and second 2D coordinates mapped back to the 2D plane, and morphing the target in the first 2D image based on the first 2D coordinates and the second 2D coordinates. In this way, compared to direct morphing of the target in a 2D plane, unnecessary morphing is reduced, improving an effect of morphing a 2D image.

BRIEF DESCRIPTION OF THE ACCOMPANYING DRAWINGS

DETAILED DESCRIPTION

A technical solution herein is elaborated below with reference to embodiments and drawings herein.

Figure 1:
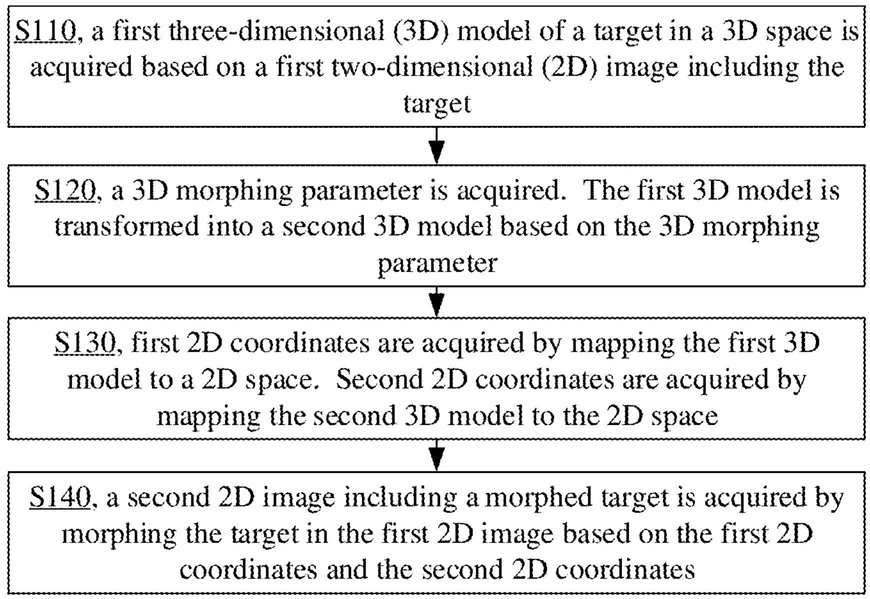
FIG. 1 is a flowchart of a first method for processing an image according to an embodiment herein.

As shown in FIG. 1, according to an embodiment herein, a method for processing an image may include steps as follows.

In S110, a first three-dimensional (3D) model of a target in a 3D space is acquired based on a first two-dimensional (2D) image including the target.

In S120, a 3D morphing parameter is acquired. The first 3D model is transformed into a second 3D model based on the 3D morphing parameter.

In S130, first 2D coordinates are acquired by mapping the first 3D model to a 2D space. Second 2D coordinates are acquired by mapping the second 3D model to the 2D space.

In S140, a second 2D image including a morphed target is acquired by morphing the target in the first 2D image based on the first 2D coordinates and the second 2D coordinates.

A method for processing an image herein may be applied to various devices for processing an image. Exemplarily, a device for processing an image may include various kinds of terminal equipment. Terminal equipment may include a mobile phone, wearable equipment, etc. Terminal equipment may also include on-board terminal equipment or fixed terminal equipment fixed at a location and dedicated to image collecting photography. In some other embodiments, a device for processing an image may also include a server, such as a local server, a cloud server providing image processing service in a cloud platform.

In some optional embodiments, a 2D image may be collected through a 2D camera. Exemplarily, a 2D image may be a Red Green Blue (RGB) image or a YUV image. YUV is a color coding mode, with "Y" representing luminance or luma, i.e., a grayscale value, and "U" and "V" representing chrominance or chroma, for describing color and saturation of an image.

Figure 6A:
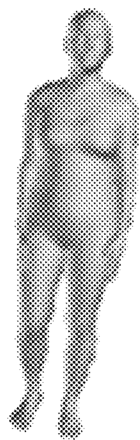
FIG. 6A is a diagram of an effect of a 3D model according to an embodiment herein.
Figure 6B:
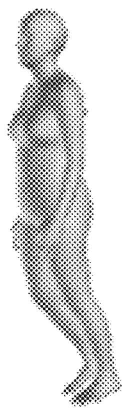
FIG. 6B is a diagram of an effect of another 3D model according to an embodiment herein.

In some optional embodiments, to implement optimized morphing of a target in a 2D image, herein, the target in the 2D image may not be morphed directly. Instead, a 3D model of the target in the 3D space may be acquired based on the 2D image. The 3D model may be denoted as the first 3D model. FIG. 6A and FIG. 6B are diagrams of effects of two first 3D models corresponding to different targets.

A 3D morphing parameter may be acquired based on a first 3D model. Exemplarily, a 3D morphing parameter may include a transformation parameter for one or more 3D coordinates on a first 3D model in the 3D space.

Exemplarily, the transformation parameter may include at least one of an expected ratio between two parts of the 3D model, an expected size of a part of the 3D model, a morphing direction for transforming the first 3D model into the second 3D model, a morphing amplitude along a corresponding morphing direction, etc.

An expected ratio between two parts of the 3D model may be a scalar representing a ratio of two different parts. For example, the ratio may be a ratio of a length of an upper body of a human to a leg length of the human.

For example, for a target human, an expected size of a part of the 3D model may include a size such as a leg length, a waist width, a height, etc., of the human, for example.

In some embodiments, the method may further include a step as follows. A first 2D morphing parameter of the first 2D image may be acquired. The 3D morphing parameter may be acquired according to the first 2D morphing parameter and a mapping relation between the 2D space and the 3D space.

For example, the first 2D image may be displayed on a 2D human-computer interaction interface. A user may move 2D coordinates of one or more parts of the target on the first 2D image, e.g., manually. A device for processing an image may determine a first 2D morphing parameter according to a user operation input by the user. A first 2D morphing parameter may include contour points on the first 2D image in the 2D space that have been subject to 2D coordinate transformation, and coordinate transformation values of the contour points. The first 2D morphing parameter may be transformed into the 3D morphing parameter according to the mapping relation between the 2D space and the 3D space.

In some embodiments, a 3D morphing parameter may be a morphing parameter generated according to a user instruction received from a human-computer interaction interface. For example, after a first 3D model has been constructed, one plane of the first 3D model may be displayed at a time on a 2D interface. Different planes of the first 3D model may be displayed on the 2D interface by way of rotation or movement. In such a case, the 3D morphing parameter may also be determined through each user operation on different planes of the first 3D model.

In some embodiments, a user instruction input by a user may be received on a human-computer interaction interface. The user instruction may be configured at least for indicating a morphing effect or a morphing amount. A 3D morphing parameter may be acquired by quantifying the user instruction. For example, a user A may expect to present a waistline of 2 chi on a photo of the user A after the photo has been subject to a slimming operation. In such a case, the expected waistline may be input to the human-computer interaction interface. The device for processing an image may estimate an actual waistline of the user according to the first 3D model acquired by mapping the first 2D image to the 3D space. Then, the device may acquire a change in the waistline in the 3D space according to the estimated actual waistline and the expected waistline. The device may determine a displacement of each coordinate on a waist surface of the first 3D model combining an ideal shape of the waist, thereby acquiring the 3D morphing parameter. The 3D morphing parameter thus acquired may serve to transform the first 3D model into the second 3D model.

After the 3D morphing parameter has been acquired, the first 3D model may be transformed based on the 3D morphing parameter, generating the second 3D model different from the first 3D model. The second 3D model may differ from the first 3D model in that 3D coordinates of contour points on a surface of the second 3D model may differ from coordinates of contour points on a surface of the first 3D model at least partly. Therefore, morphology corresponding to the second 3D model may differ from that corresponding to the first 3D model. Exemplarily, the target may be a human. Then, human body morphology corresponding to the second 3D model may differ from human body morphology corresponding to the first 3D model. For example, compared to the human corresponding to the second 3D model, the human corresponding to the first 3D model may appear to have a greater body weight.

In this way, the first 3D model and the second 3D model may be acquired after S120.

In some optional embodiments, S130 herein may include a step as follows. The first 2D coordinates representing a first projection corresponding to the first 3D model and the second 2D coordinates representing a second projection corresponding to the second 3D model may be acquired respectively by projecting the first 3D model and the second 3D model respectively onto a 2D plane.

In some optional embodiments, S130 may further include a step as follows. A second 2D morphing parameter may be acquired according to the first 2D coordinates and the second 2D coordinates. With the second 2D morphing parameter, the first 2D coordinates may be transformed into the second 2D coordinates.

In some optional embodiments herein, values of a first 2D coordinate and a second 2D coordinate may be compared to acquire a difference between the first 2D coordinate and the second 2D coordinate. The difference may serve as a second 2D morphing parameter. For example, in breast enhancement morphing, the first 2D coordinates may include first 2D coordinates acquired by mapping contour points on a chest surface of the first 3D model back to the 2D space. The second 2D coordinates may be acquired by mapping, back to the 2D space, contour points on a chest surface of the second 3D model acquired by performing breast enhancement on the first 3D model. 2D coordinates of the two chests may be compared to acquire the second 2D morphing parameter.

In some embodiments, when any change in a part may involve 2D coordinate transformation of multiple contour points, transformation and fitting may be performed on first 2D coordinates and second 2D coordinates corresponding to the first 2D coordinates to acquire a transformation matrix for transforming the first 2D coordinates into the second 2D coordinates. The transformation matrix may serve directly as the second 2D morphing parameter for morphing the target on the first 2D image. The target in the 2D image may be morphed based on the second 2D morphing parameter, thereby acquiring the second 2D image including the morphed target.

In some optional embodiments herein, the second 2D morphing parameter may further include at least one of a reorganization algorithm or a reorganization parameter for reorganizing pixels in the target, a color changing algorithm for changing a color of a pixel in the target, etc.

Exemplarily, morphing of a target in a 2D image may include, but is not limited to, at least one of lateral morphing of the target, vertical morphing of the target, morphing the shape of a facial feature of the target.

For example, the target may be a human. Morphing of the target may be lateral morphing of the human, vertical morphing of the human, morphing the shape of a facial feature of the target, changing an arm length or a leg length of the human, etc., for example.

Here, a target in a 2D plane may be morphed not by directly morphing an image in the 2D plane, but by transforming the target in the first 2D image into the first 3D model in the 3D space. The target may be morphed by directly morphing the first 3D model by acquiring a 3D morphing parameter, acquiring the morphed second 3D model, then mapping the first 3D model and the second 3D model respectively to the 2D space to acquire first 2D coordinates and second 2D coordinates mapped back to the 2D plane, and morphing the target in the first 2D image based on the first 2D coordinates and the second 2D coordinates. In this way, compared to direct morphing of the target in a 2D plane, unnecessary morphing is reduced, improving an effect of morphing a 2D image.

In some optional embodiments, in S110, a first 3D model of the target in the 3D space may be acquired based on the first 2D image including the target. The first 3D model may include multiple polygonal meshes.

Exemplarily, the first 3D model may be a stereoscopic model in the 3D space. The first 3D model may include numerous key points. Multiple key points in the numerous key points may be connected, forming polygonal meshes. A polygonal mesh may also be referred to as a mesh, which is a data structure for modeling various irregular objects in computer graphics. A triangular mesh (also referred to as a triangular patch) is one type of polygonal mesh. Three adjacent key points in the numerous key points may be connected to form a triangular mesh to acquire a first 3D model consisting of multiple triangular meshes.

Such a first 3D model formed by meshes may simulate a to-be-collected object in the 3D space corresponding to the target truthfully, thereby restoring the to-be-collected object in the 3D space truthfully, ensuring an effect of image morphing.

In some embodiments, in S110, the first 3D model of the target in the 3D space may be acquired based on the first 2D image including the target, as follows. A first reconstruction parameter for reconstructing a 3D model of the target may be extracted from the first 2D image through a Human Mesh Recovery (HMR) model. The first 3D model of the target in the 3D space may be reconstructed using the first reconstruction parameter as extracted. The first reconstruction parameter may include at least one of first joint point parameters of the target, a first morphological parameter of the target, a camera parameter of the first 2D image, etc. Exemplarily, the first 3D model may be built precisely based on the camera parameter of the 2D image, the first morphological parameter of the target, and the first joint point parameters of the target.

In some embodiments, first joint point parameters may include 3D coordinates of a first joint point, etc. The target may include many joint points, some of which may not be used in forming the first 3D model. Other joint points used in forming the first 3D model may be referred to as first joint points. For example, a human may include many joints. Key points of the joints may be referred to as joint points. In constructing the first 3D model, some joint points of the human that are not vital for presenting appearance of the human may be ignored. For example, a joint point corresponding to a joint of a hand for bending a finger may be unimportant and may be ignored.

In some embodiments, a first morphological parameter of a target may include various parameters indicating sizes of the target in different dimensions, such as a height of the target, a weight of the target, a size of a part of the target, etc. A size of a part may include a morphological parameter of a waistline, a bustline, a hipline, the length of the face, etc., for example.

In some embodiments, a camera parameter of a 2D image (such as the camera parameter of the first 2D image) may include an intrinsic parameter of a camera used to capture the 2D image. Such an intrinsic parameter may include, but is not limited to, a focal length, a width dx of a single pixel of the 2D image in a world coordinate system, a height dy of the single pixel of the 2D image in the world coordinate system, etc.

Exemplarily, consider that the target is a human as an example. After the first 2D image including the human has been input to the HMR model, the HMR model may compute a parameter of each key point of the human in the first 2D image. For example, such a parameter may include 3D coordinates of joint points corresponding to 24 joints on a human skeleton, as well as a morphological parameter of the human. In addition, the HMR model may also output a camera parameter of a camera used to capture the first 2D image. The camera parameter may include a focal length, an optical center coordinate, etc., for example.

Furthermore, a skeleton of the first 3D model may be reconstructed using a parameterized human model and a parameter output by the HMR model. The skeleton may be rendered. A Skinned Multi-Person Linear (SMPL) model may be used as a parameterized human model, for example. The SMPL model may be a skinned vertex-based human 3D model, capable of indicating different shapes and poses of a human body precisely.

Exemplarily, the HMR model may output coordinates of a joint point corresponding to each joint on each skeleton in the first 2D image. Morphology of the human may depend on not only the skeleton but also a feature of a tissue and/or an organ, such as a muscle, etc. With the SMPL model, movement of a muscular and distribution of tissues around the periphery of the skeleton may be simulated according to 3D coordinates of the skeleton that are acquired by the HMR model as well as a morphological parameter of the human extracted from the first 2D image, thereby rendering the skeleton, acquiring the first 3D model. A first 3D model thus acquired may truthfully reflect each feature of the target in the first 2D image.

Figure 5A:
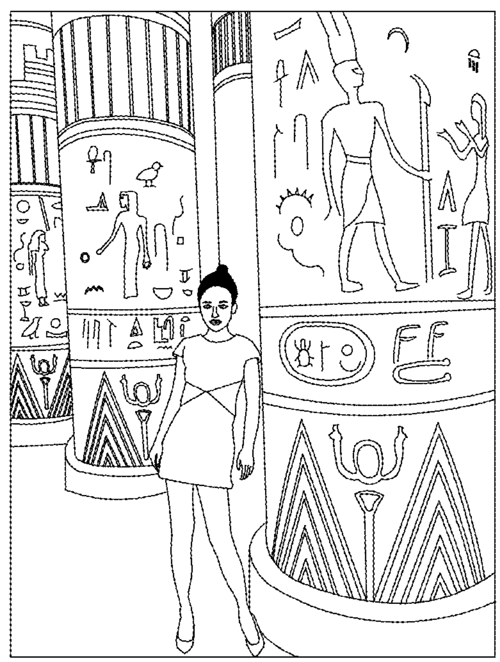
FIG. 5A is a diagram of an effect of a 2D image according to an embodiment herein.
Figure 5B:
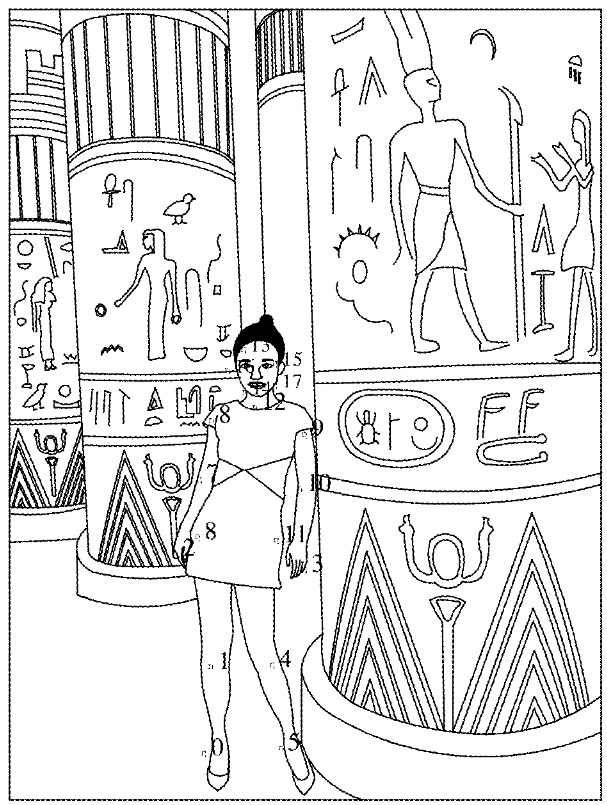
FIG. 5B is a diagram of extracted human joint points according to an embodiment herein.

FIG. 5A is a diagram of an original first 2D image as acquired. FIG. 5B is a diagram including first joint points extracted from the human shown in FIG. 5A. The joint points are represented by solid dots distributed on the human.

In some embodiments, the method may further include a step as follows. A second joint point parameter of the target may be extracted from the first 2D image. Such a second joint point parameter and a first joint point parameter herein may both be parameters of a joint point in the human, yet may be extracted in differently ways. Alternatively, the first joint point parameter and the second joint point parameter may be of different precisions. Alternatively, the first joint point parameter and the second joint point parameter may be of different types.

For example, a first joint point parameter may include a 3D coordinate of a first joint point, while a second joint point parameter may include a 2D coordinate of the first joint point.

As another example, a first joint point parameter may be extracted using an HMR model, while a second joint point parameter may be extracted using a human detection model. A human detection model may acquire a 2D coordinate of a joint point on a human skeleton according to an input first 2D image.

In some optional embodiments, a second joint point parameter extracted from the 2D image separately may have a higher precision than a first joint point parameter in the first reconstruction parameter. In view of this, the method may further include a step as follows. Second joint point parameters of the target may be extracted from the first 2D image through a human detection model (such as an OPEN POSE model). Second joint points represented by the second joint point parameters may coincide with a part of first joint points represented by the first joint point parameters.

The first 3D model of the target in the 3D space may be reconstructed using the first reconstruction parameter as extracted, as follows. A second reconstruction parameter may be formed by replacing, with the second joint point parameters, first joint point parameters of the part of the first joint points coinciding with the second joint points in the first reconstruction parameter. The first 3D model of the target in the 3D space may be reconstructed based on the second reconstruction parameter.

Understandably, compared to the first reconstruction parameter, in the second reconstruction parameter, part of the first joint point parameters in the first reconstruction parameter may be replaced with the second joint point parameters.

For example, there may be M first joint point parameters and N second joint point parameters. The N may be less than or equal to the M. Exemplarily, the M may be 25, and the N may be 14. Of the 25 first joint point parameters, those first joint point parameters pointing to same joint points as the 14 second joint point parameters may be replaced with the second joint point parameters. As the second joint point parameters are 2D coordinates, when the first joint point parameters are replaced, it is the 2D coordinates included in the 3D coordinates that are replaced, while any remaining parameter in the 3D coordinates may remain the same. That is, the first joint point parameters of the part of the first joint points coinciding with the second joint points may be replaced with the second joint point parameters to form the second reconstruction parameter. For example, a set of 3D coordinates may include three coordinates corresponding to an x axis, a y axis, and a z axis. A set of 2D coordinates may include two coordinates corresponding to the x axis and the y axis. During replacement, if a set of 3D coordinates and a set of 2D coordinates correspond to a same joint point, the 2D coordinates may replace the x coordinate and the y coordinate in the 3D coordinates, acquiring the second reconstruction parameter.

Figure 2:
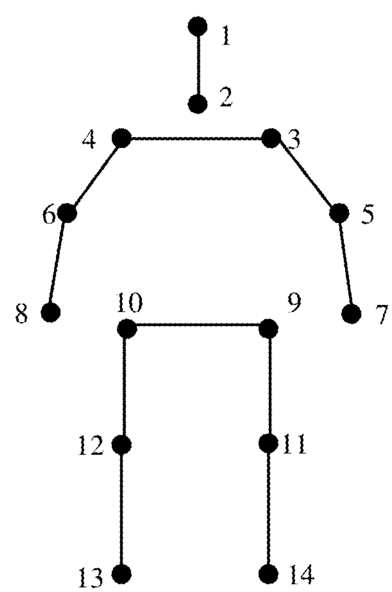
FIG. 2 is a diagram of 14 human joint points according to an embodiment herein.
Figure 3:
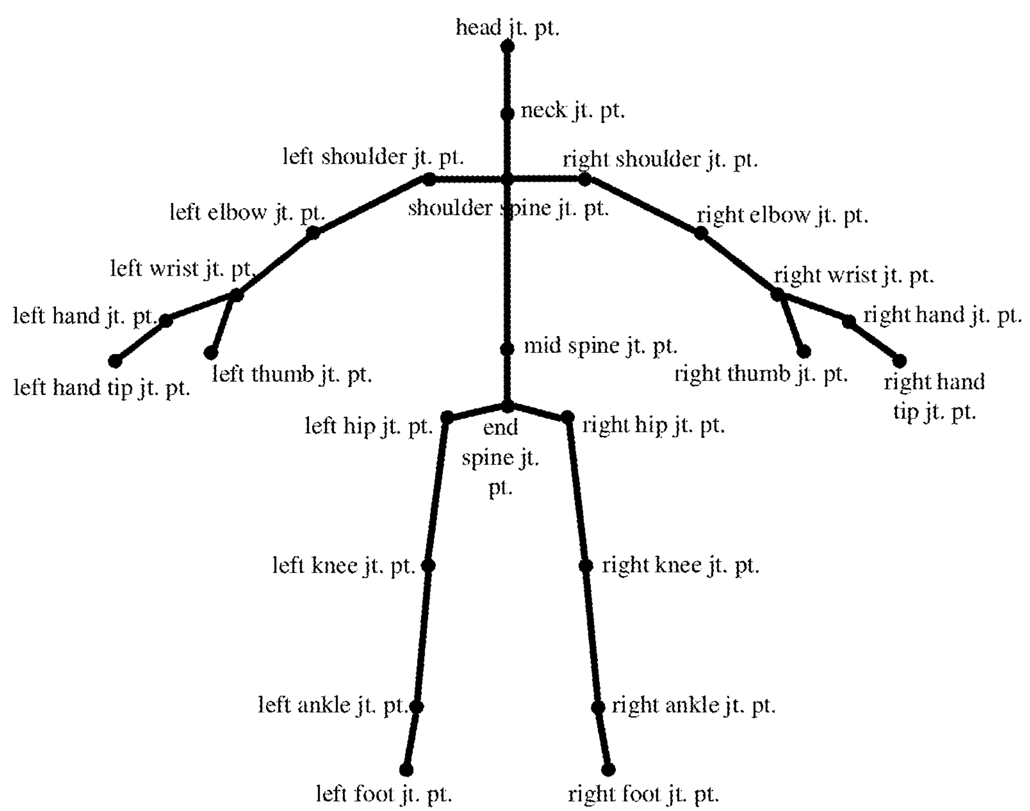
FIG. 3 is a diagram of 25 human joint points according to an embodiment herein.

As an example, consider that the target is a human. FIG. 2 is a human skeleton of 14 second joint points. FIG. 3 is a human skeleton of 25 first joint points. An end spine joint point in FIG. 3 is a center point of a left hip joint point and a right hip joint point, and thus may be ignored. It may be seen that the 14 joint points in FIG. 2 are included in the 25 joint points in FIG. 3.

FIG. 2 includes: a joint point 1 as a head joint point, a joint point 2 as a neck joint point, a joint point 4 as a left shoulder joint point, a joint point 3 as a right shoulder joint point, a joint point 6 as a left elbow joint point, a joint point 5 as a right elbow joint point, a joint point 8 as a left wrist joint point, a joint point 7 as a right wrist joint point, a joint point 10 as the left hip joint point, a joint point 9 as the right hip joint point, a joint point 12 as a left knee joint point, a joint point 11 as a right knee joint point, a joint point 13 as a left ankle joint point, and a joint point 14 as a right ankle joint point.

Compared to FIG. 2, FIG. 3 includes, in addition: the end spine joint point, a shoulder spine joint point, a mid spine joint point, a left hand tip joint point, a right hand tip joint point, a left thumb joint point, a right thumb joint point, a left hand joint point, a right hand joint point, a left foot joint point, and a right foot joint point.

Since a statistical precision of a second joint point parameter is higher than a statistical precision of a first joint point parameter, to improve the precision in constructing the first 3D model, part of the first joint point parameters corresponding to the second joint point parameters may be replaced directly with the second joint point parameters. Then, the first 3D model may be constructed based on the replacement second preset parameters.

In some embodiments, S130 may include a step as follows. The first 2D coordinates and the second 2D coordinates may be acquired by mapping the first 3D model and the second 3D model respectively to the 2D space according to a camera parameter corresponding to the first 2D image.

Understandably, a camera parameter may be an intrinsic parameter of a camera. A camera parameter may include lengths of the first 2D image along two directions in the world coordinate system perpendicular to each other, and may also include a parameter such as a focal length. Sizes of projection surfaces onto which the first 3D model and the second 3D model are projected may be determined through the lengths of the first 2D image along the two directions in the world coordinate system perpendicular to each other. Projected areas of projecting the first 3D model and second 3D model onto the projection surfaces may be determined based on the focal length. In such a mode, the first 3D model may be mapped to the 2D space, and the second 3D model may be mapped to the 2D space.

A mapping projection may be acquired by mapping the first 3D model to the 2D space. Coordinates of the mapping projection may be the first 2D coordinates. Similarly, a mapping projection may be acquired by mapping the second 3D model to the 2D space. Coordinates of the mapping projection may be the second 2D coordinates.

Figure 4:
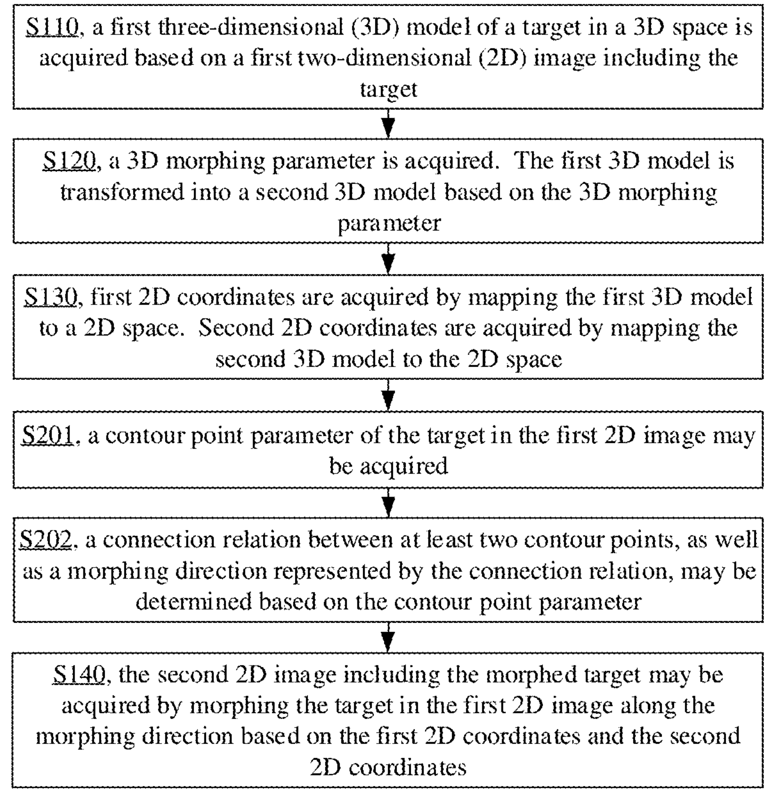
FIG. 4 is a flowchart of a second method for processing an image according to an embodiment herein.

In some embodiments, as shown in FIG. 4, the method may further include steps as follows.

In S201, a contour point parameter of the target in the first 2D image may be acquired.

In S202, a connection relation between at least two contour points, as well as a morphing direction represented by the connection relation, may be determined based on the contour point parameter.

Then, in S140, the second 2D image including the morphed target may be acquired by morphing the target in the first 2D image based on the first 2D coordinates and the second 2D coordinates as follows. The second 2D image including the morphed target may be acquired by morphing the target in the first 2D image along the morphing direction based on the first 2D coordinates and the second 2D coordinates.

Figure 5C:
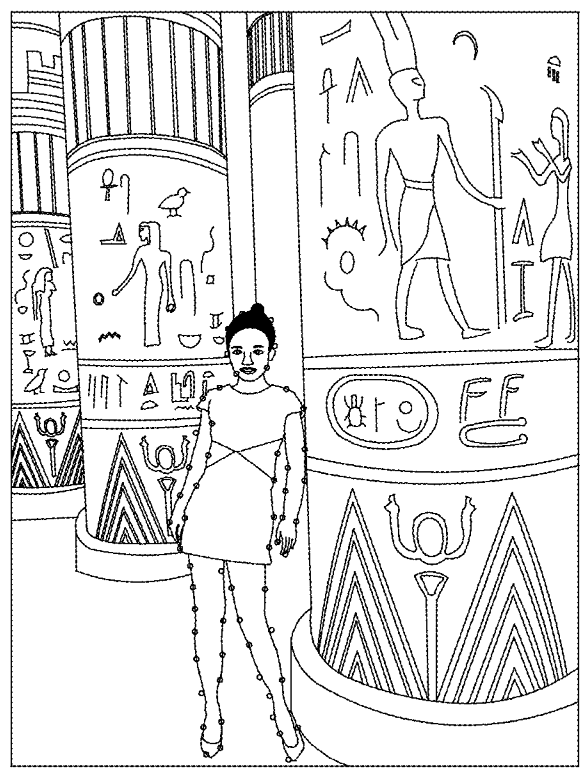
FIG. 5C is a diagram of extracted human contour points according to an embodiment herein.

Here, a contour point parameter of the target in the first 2D image may be extracted using a contour point model capable of extracting a target contour point in the first 2D image. A contour point parameter may include, but is not limited to, a contour point coordinate. FIG. 5C is a diagram of a type of contour points, as extracted, of the human in FIG. 5A.

A process of morphing the target based on the first 2D coordinates and the second 2D coordinates to morph the first 2D image into the second 2D image may involve transforming the first 2D coordinates into the second 2D coordinates. In application, the first 2D coordinates may be changed into the second 2D coordinates in many modes, but some of the modes may mess up the morphed target. To reduce such a phenomenon, here, a contour point parameter of the target in the first 2D image may be acquired, and two predetermined contour points may be connected based on the contour point parameter, acquiring a morphing direction for transforming first 2D coordinates corresponding to a part of the target into second 2D coordinates.

In S140, rather than in a random mode of merely transforming the first 2D coordinates into the second 2D coordinates, the target may be morphed along the morphing direction determined in S202. Performing morphing according to the morphing direction further improves the morphing effect.

In some optional embodiments, S201 may include a step as follows. The morphing direction may be determined according to a first connection direction of contour points of at least two symmetrically distributed parts in the target based on the contour point parameter. The morphing direction may include at least one of a first morphing direction parallel to the first connection direction or a second morphing direction perpendicular to the first connection direction.

Exemplarily, two symmetrically distributed parts of the human may include at least one of the left shoulder and the right shoulder of the human, the left leg and the right leg of the human, the left chest and the right chest of the human, the left hip and the right hip of the human, etc.

Exemplarily, two symmetric parts symmetrically distributed of the human body may be taken as four predetermined parts. A first connection direction for morphing the front of the human body may be determined by taking the left shoulder and the right shoulder of the human as a group. A first connection direction for morphing the back of the human body may be determined according to the left hip and the right hip of the human.

In some other embodiments, S201 may further include a step as follows. The morphing direction may be determined according to a second connection direction of at least two contour points symmetrically distributed about a central point or a centerline of a predetermined part in the target based on the contour point parameter. The morphing direction may include a third morphing direction parallel to the second connection direction and/or a fourth morphing direction perpendicular to the second connection direction.

For example, consider a human as an example. The predetermined part may include at least one of the left leg, the right leg, the left arm, the right arm, etc.

For example, a connection direction of contour points on both sides of the left leg may be a second connection direction. A connection direction of contour points on both sides of the right leg may be a second connection direction.

In some optional embodiments herein, a morphing direction may include at least two major types of directions. One type of directions may be morphing directions for adjusting the weight or lateral size of the target, such as the first morphing direction and/or the third morphing direction. The other type of directions may be morphing directions for adjusting the height of the target, such as the second morphing direction and/or the fourth morphing direction. The second morphing direction may be perpendicular to the first morphing direction. The fourth morphing direction may be perpendicular to the second morphing direction.

Figure 5D:
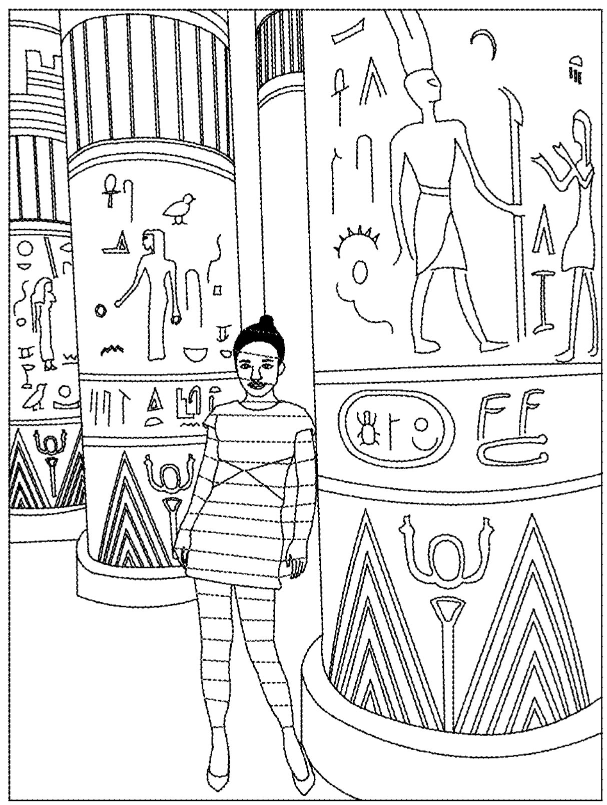
FIG. 5D is a diagram of a first morphing direction according to an embodiment herein.
Figure 5E:
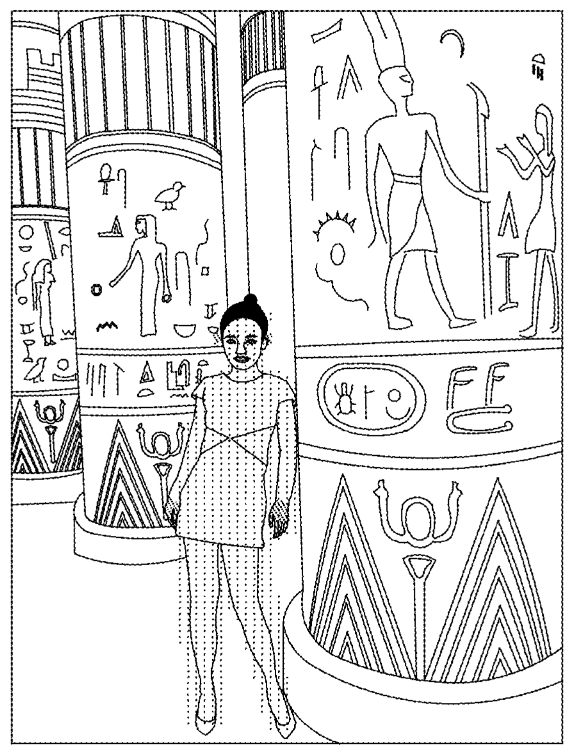
FIG. 5E is a diagram of a second morphing direction according to an embodiment herein.

Exemplarily, in FIG. 5D, solid horizontal lines are added on the human shown in FIG. 5A. The solid horizontal lines may correspond to the first morphing direction and/or the third morphing direction. Vertical dotted lines covering the human shown in FIG. 5E are lines perpendicular to the solid horizontal lines in FIG. 5D, and correspond to the second morphing direction and/or the fourth morphing direction.

In some optional embodiments, S140 may include a step as follows. A second 2D morphing parameter for moving from the first 2D coordinates to the second 2D coordinates along a morphing direction may be determined. The second 2D image including the morphed target may be acquired by morphing the target in the first 2D image based on the second 2D morphing parameter.

For example, the first 2D coordinates may correspond to coordinates of the same location corresponding to the target or the same joint point of the target in the second 2D coordinates, and may be moved along the morphing direction. Thus, a morphing algorithm (a morphing function) for morphing a corresponding location of the target in the 2D image may be acquired by fitting, thereby acquiring a 2D morphing parameter. Finally, in S140, the target in the 2D image may be morphed according to the 2D morphing parameter.

In some embodiments, S120 may include a step as follows. The second 3D model may be acquired by changing coordinates of at least part of contour points of the first 3D model based on the 3D morphing parameter. A new 3D model may be acquired by changing one or more 3D coordinates of a contour point on the surface of the first 3D model. The new 3D model may be referred to as the second 3D model herein.

Figure 7:
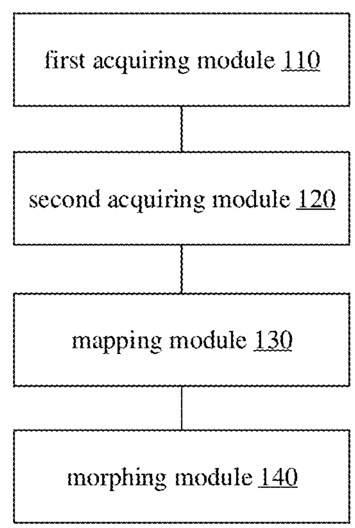
FIG. 7 is a diagram of a structure of a device for processing an image according to an embodiment herein.

Embodiments herein further provide a device for processing an image. As shown in FIG. 7, the device for processing an image may include a first acquiring module 110, a second acquiring module 120, a mapping module 130, and a morphing module 140.

The first acquiring module 110 is configured for acquiring a first three-dimensional (3D) model of a target in a 3D space based on a first two-dimensional (2D) image including the target.

The second acquiring module 120 is configured for acquiring a 3D morphing parameter, and transforming the first 3D model into a second 3D model based on the 3D morphing parameter.

The mapping module 130 is configured for acquiring first 2D coordinates by mapping the first 3D model to a 2D space, and acquiring second 2D coordinates by mapping the second 3D model to the 2D space.

The morphing module 140 is configured for acquiring a second 2D image including a morphed target by morphing the target in the first 2D image based on the first 2D coordinates and the second 2D coordinates.

In some embodiments, the first acquiring module 110, the second acquiring module 120, the mapping module 130, and the morphing module 140 may all be program modules. When executed by a processor, the program modules may implement a function herein.

In some other embodiments, the first acquiring module 110, the second acquiring module 120, the mapping module 130, and the morphing module 140 may all be modules combining software and hardware. A module combining software and hardware may include, but is not limited to, a programmable array. A programmable array may include, but is not limited to, Complex Programmable Logic Devices (CPLD), Field-Programmable Gate Arrays (FPGA), etc.

In some other embodiments, the first acquiring module 110, the second acquiring module 120, the mapping module 130, and the morphing module 140 may all be pure hardware modules. A pure hardware module may include, but is not limited to, an Application Specific Integrated Circuit (ASIC).

In some embodiments, the first acquiring module 110 may be configured for: extracting, from the first 2D image through a Human Mesh Recovery (HMR) model, a first reconstruction parameter for reconstructing a 3D model of the target; and reconstructing the first 3D model of the target in the 3D space using the first reconstruction parameter as extracted.

In some embodiments, the first reconstruction parameter may include at least one of first joint point parameters of the target, a first morphological parameter of the target, or a camera parameter of the first 2D image.

In some embodiments, the device may further include an extracting module.

The extracting module may be configured for extracting second joint point parameters of the target from the first 2D image through a human detection model. Second joint points represented by the second joint point parameters may coincide with a part of first joint points represented by the first joint point parameters.

The first acquiring module 110 may be configured for: forming a second reconstruction parameter by replacing, with the second joint point parameters, first joint point parameters of the part of the first joint points coinciding with the second joint points in the first reconstruction parameter; and reconstructing the first 3D model of the target in the 3D space based on the second reconstruction parameter.

In some embodiments, the mapping module 130 may be configured for acquiring the first 2D coordinates and the second 2D coordinates by mapping the first 3D model and the second 3D model respectively to the 2D space according to a camera parameter corresponding to the first 2D image.

In some embodiments, the device may further include a third acquiring module.

The third acquiring module may be configured for acquiring a first 2D morphing parameter of the first 2D image.

The second acquiring module 120 may be configured for acquiring the 3D morphing parameter according to the first 2D morphing parameter and a mapping relation between the 2D space and the 3D space.

In some embodiments, the device may further include a fourth acquiring module and a determining module.

The fourth acquiring module may be configured for acquiring a contour point parameter of the target in the first 2D image.

The determining module may be configured for determining, based on the contour point parameter, a connection relation between at least two contour points, as well as a morphing direction represented by the connection relation.

The morphing module 140 may be configured for acquiring the second 2D image including the morphed target by morphing the target in the first 2D image along the morphing direction based on the first 2D coordinates and the second 2D coordinates.

In some embodiments, the determining module may be configured for determining the morphing direction according to a first connection direction of contour points of at least two symmetrically distributed parts in the target based on the contour point parameter. The morphing direction may include at least one of a first morphing direction parallel to the first connection direction or a second morphing direction perpendicular to the first connection direction.

In some embodiments, the determining module may be configured for determining the morphing direction according to a second connection direction of at least two contour points symmetrically distributed about a central point or a centerline of a predetermined part in the target based on the contour point parameter. The morphing direction may include a third morphing direction parallel to the second connection direction and/or a fourth morphing direction perpendicular to the second connection direction.

In some embodiments, the morphing module 140 may be configured for: determining a second 2D morphing parameter for moving from the first 2D coordinates to the second 2D coordinates along a morphing direction; and acquiring the second 2D image including the morphed target by morphing the target in the first 2D image based on the second 2D morphing parameter.

In some embodiments, the second acquiring module 120 may be configured for acquiring the second 3D model by changing coordinates of at least part of contour points of the first 3D model based on the 3D morphing parameter.

A specific example is provided below combining any embodiment herein.

The example provides a method for processing an image, which may include a step as follows.

Joint point parameters of N joints of a human may be extracted from a single first 2D image using an Open Pose model. The N may be a positive integer.

The first 2D image may be input to an HMR model. The HMR model may output a first reconstruction parameter as extracted. The first reconstruction parameter may include 3D coordinates of M1 joint points (other than an end spine joint point) in the human. Therefore, M1×3 parameters may be acquired. Meanwhile, the HMR module may also acquire M2 camera intrinsic parameters of a camera that has captured the first 2D image. The M2 camera intrinsic parameters may include a focal length when collecting the first 2D image, and a width and a height of a single pixel in the 2D image in a world coordinate system, respectively. In this way, the first reconstruction parameter consisting of M1×3+M2 parameters may be acquired through the HMR module. Both the M1 and the M2 may be positive integers.

N1 joint point parameters in the M1×3+M2 parameters may be replaced with N joint point parameters provided by the Open Pose model, forming an updated first reconstruction parameter, i.e., the second reconstruction parameter. The N1 may be a positive integer.

A 3D model may be reconstructed based on the second reconstruction parameter using an SMPL model. The 3D model may be rendered, acquiring the first 3D model. The first 3D model may consist of X joint points and more than Y times ten thousands of triangular patches formed based on these joint points. Both the X and the Y may be positive integers.

A 2D morphing parameter may be received from a human-computer interaction interface or other equipment. The 2D morphing parameter may be transformed into a 3D morphing parameter. The first 3D model may be adjusted based on the 3D morphing parameter, generating a second 3D model acquired by transforming the first 3D model.

After the second 3D model has been acquired, the two 3D models may be mapped to a 2D plane according to a camera parameter, to acquire first 2D coordinates and second 2D coordinates corresponding respectively to the two models. A first 2D coordinate and a second 2D coordinate may both correspond to one joint point of the human.

A contour point of the human in the first 2D image may be detected using a human contour detection model to acquire a coordinate of the contour point. A morphing direction may be determined according to a part to be morphed and a morphing requirement.

Exemplarily, there may be Z contour points. The Z may be a positive integer.

For example, to perform lateral morphing on the human, contour points of the human may be connected laterally, thereby acquiring a corresponding connection direction. A first connection direction may be acquired by connecting a left shoulder contour point and a right shoulder contour point. To morph a size of the shoulder, a 2D morphing parameter (such as a 2D morphing algorithm) for morphing the shoulder may be acquired by fitting according to first 2D coordinates of the shoulder, the first connection direction, and second 2D coordinates of the shoulder. Then, the shoulder of the target may be morphed according to the 2D morphing parameter.

Specifically, the direction of a line connecting two endpoints of parts corresponding to the first 2D coordinates and the second 2D coordinates may be acquired as a vector direction of a first group of vectors according to contour points of the parts. Meanwhile, a second group of vectors may be introduced. A vector direction of the second group of vectors may be perpendicular to the vector direction of the first group of vectors. If the vector direction of the first group of vectors is consistent with a direction along which the human puts on or loses weight, the human figure may be morphed along the vector direction of the first group of vectors to “put on or lose weight”. Meanwhile, the human figure may be morphed along the vector direction of the second group of vectors to morph the height of the human figure.

For example, the shoulder in the first 2D image may be directly stretched and widened. The shoulder in the first 2D image may be narrowed down, and then a background other than the human (i.e., the target) may be stretched to fill in a blank space formed after the shoulder of the human has been narrowed down, thereby acquiring a second 2D image after morphing.

Figure 8:
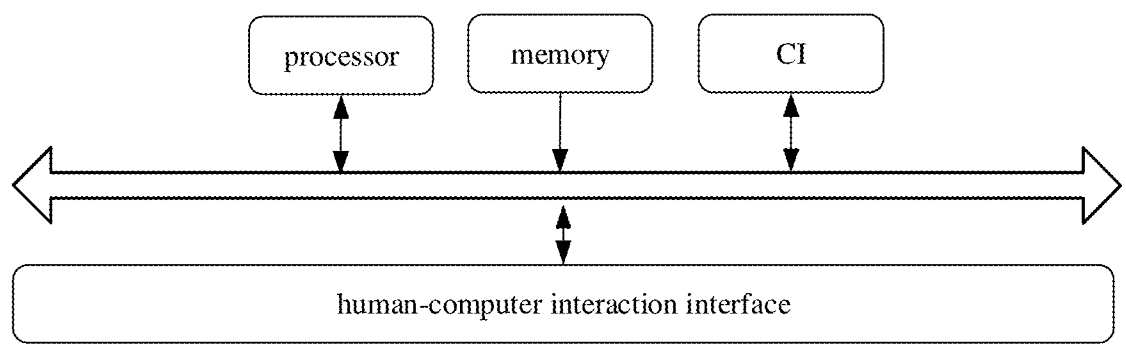
FIG. 8 is a diagram of a structure of a device for processing an image according to an embodiment herein.

As shown in FIG. 8, embodiments herein further provide a device for processing an image, which may include memory and a processor.

The memory is configured for storing computer-executable instructions.

The processor is connected to the memory, and is configured for implementing the computer-executable instruction stored in the memory to implement a method for processing an image according to one or more technical solutions herein, such as at least one of the methods shown in FIG. 1 and/or FIG. 4.

The memory may be various types of memory, such as Random Access Memory (RAM), Read-Only Memory (ROM), flash memory, etc. The memory may be used for storing information, such as computer-executable instructions. The computer-executable instructions may be various program instructions, such as target program instructions and/or source program instructions.

The processor may be various types of processors, such as a central processing unit, a microprocessor, a digital signal processor, a programmable array, a digital signal processor, an application specific integrated circuit, an image processor, etc.

The processor may be connected to the memory through a bus. The bus may be an integrated circuit bus, etc.

In some embodiments, the terminal equipment may further include a communication interface (CI). The communication interface may include a network interface, such as a local area network interface, a transceiver antenna, etc. The communication interface may also be connected to the processor and may be configured for transmitting and receiving information.

In some embodiments, the terminal equipment may further include a human-computer interaction interface. For example, the human-computer interaction interface may include various input/output equipment such as a keyboard, a touch screen, etc.

In some embodiments, the device for processing an image may further include a display. The display may display various prompts, collected face images and/or various interfaces.

Embodiments herein provide a computer storage medium, having stored thereon computer-executable instructions which, when executed by a processor, implement a method for processing an image according to one or more technical solutions herein, such as at least one of the methods shown in FIG. 1 and/or FIG. 4.

Note that in embodiments provided herein, the disclosed equipment and method may be implemented in other ways. The described equipment embodiments are merely exemplary. For example, the unit division is merely logical function division and can be other division in actual implementation. For example, multiple units or components can be combined, or integrated into another system, or some features/characteristics can be omitted or skipped. Furthermore, the coupling, or direct coupling or communicational connection among the components illustrated or discussed herein may be implemented through indirect coupling or communicational connection among some interfaces, equipment, or units, and may be electrical, mechanical, or in other forms.

The units described as separate components may or may not be physically separated. Components shown as units may be or may not be physical units. They may be located in one place, or distributed on multiple network units. Some or all of the units may be selected to achieve the purpose of a solution of the present embodiments as needed.

In addition, various functional units in each embodiment of the subject disclosure may be integrated in one processing unit, or exist as separate units respectively; or two or more such units may be integrated in one unit. The integrated unit may be implemented in form of hardware, or hardware plus software functional unit(s).

A skilled person in the art may understand that all or part of the steps of the embodiments may be implemented by instructing a related hardware through a program, which program may be stored in a (non-transitory) computer-readable storage medium and when executed, execute steps including those of the embodiments. The computer-readable storage medium may be various media that can store program codes, such as mobile storage equipment, Read-Only Memory (ROM), Random Access Memory (RAM), a magnetic disk, a CD, and/or the like.

Methods disclosed in method embodiments herein may be combined with each other as needed to acquire a new method embodiment, as long as no conflict results from the combination.

Features disclosed in product embodiments herein may be combined with each other as needed to acquire a new product embodiment, as long as no conflict results from the combination.

Features disclosed in method or device embodiments herein may be combined with each other as needed to acquire a new method or device embodiment, as long as no conflict results from the combination.

What described are but optional embodiments herein and are not intended to limit the scope of the subject disclosure. Any modification, equivalent replacement, and/or the like made within the technical scope of the subject disclosure, as may occur to a person having ordinary skill in the art, shall be included in the scope of the subject disclosure. The scope of the subject disclosure thus should be determined by the claims.

What is claimed is:

1. A method for processing an image, comprising:

acquiring a first three-dimensional (3D) model of a target in a 3D space based on a first two-dimensional (2D) image comprising the target;

acquiring a 3D morphing parameter, and transforming the first 3D model into a second 3D model based on the 3D morphing parameter;

acquiring first 2D coordinates by mapping the first 3D model to a 2D space, and acquiring second 2D coordinates by mapping the second 3D model to the 2D space; and acquiring a second 2D image comprising a morphed target by morphing the target in the first 2D image based on the first 2D coordinates and the second 2D coordinates, wherein acquiring the first 3D model of the target in the 3D space based on the first 2D image comprising the target comprises:

extracting, from the first 2D image through a Human Mesh Recovery (HMR) model, a first reconstruction parameter for reconstructing a 3D model of the target; and reconstructing the first 3D model of the target in the 3D space using the first reconstruction parameter as extracted, wherein the first reconstruction parameter comprises first joint point parameters of the target, wherein the method further comprises:

extracting second joint point parameters of the target from the first 2D image through a human detection model, second joint points represented by the second joint point parameters coinciding with a part of first joint points represented by the first joint point parameters, wherein reconstructing the first 3D model of the target in the 3D space using the first reconstruction parameter as extracted comprises:

forming a second reconstruction parameter by replacing, with the second joint point parameters, the first joint point parameters of the part of the first joint points coinciding with the second joint points in the first reconstruction parameter; and reconstructing the first 3D model of the target in the 3D space based on the second reconstruction parameter.

2. The method of claim 1, wherein acquiring the first 2D coordinates by mapping the first 3D model to the 2D space, and acquiring the second 2D coordinates by mapping the second 3D model to the 2D space comprises:

acquiring the first 2D coordinates and the second 2D coordinates by mapping the first 3D model and the second 3D model respectively to the 2D space according to a camera parameter of the first 2D image.

3. The method of claim 1, further comprising:

acquiring a first 2D morphing parameter of the first 2D image, wherein acquiring the 3D morphing parameter comprises:

acquiring the 3D morphing parameter according to the first 2D morphing parameter and a mapping relation between the 2D space and the 3D space.

4. The method of claim 3, wherein acquiring the second 2D image comprising the morphed target by morphing the target in the first 2D image based on the first 2D coordinates and the second 2D coordinates comprises:

determining a second 2D morphing parameter for moving from the first 2D coordinates to the second 2D coordinates along a morphing direction; and acquiring the second 2D image comprising the morphed target by morphing the target in the first 2D image based on the second 2D morphing parameter.

5. The method of claim 1, further comprising:

acquiring a contour point parameter of the target in the first 2D image; and determining, based on the contour point parameter, a connection relation between at least two contour points, as well as a morphing direction represented by the connection relation, wherein acquiring the second 2D image comprising the morphed target by morphing the target in the first 2D image based on the first 2D coordinates and the second 2D coordinates comprises:

acquiring the second 2D image comprising the morphed target by morphing the target in the first 2D image along the morphing direction based on the first 2D coordinates and the second 2D coordinates.

6. The method of claim 5, wherein determining, based on the contour point parameter, the connection relation between the at least two contour points, as well as the morphing direction represented by the connection relation comprises:

determining the morphing direction according to a first connection direction of contour points of at least two symmetrically distributed parts in the target based on the contour point parameter, the morphing direction comprising at least one of a first morphing direction parallel to the first connection direction or a second morphing direction perpendicular to the first connection direction.

7. The method of claim 5, wherein determining, based on the contour point parameter, the connection relation between the at least two contour points, as well as the morphing direction represented by the connection relation comprises:

determining the morphing direction according to a second connection direction of at least two contour points symmetrically distributed about a central point or a centerline of a predetermined part in the target based on the contour point parameter, the morphing direction comprising at least one of a third morphing direction parallel to the second connection direction or a fourth morphing direction perpendicular to the second connection direction.

8. The method of claim 1, wherein transforming the first 3D model into the second 3D model based on the 3D morphing parameter comprises:

acquiring the second 3D model by changing coordinates of at least part of contour points of the first 3D model based on the 3D morphing parameter.

9. A device for processing an image, comprising memory and a processor connected to the memory, wherein the memory is configured for storing computer-executable instructions, wherein the processor is configured for, by executing the computer-executable instructions:

acquiring a first three-dimensional (3D) model of a target in a 3D space based on a first two-dimensional (2D) image comprising the target;

acquiring a 3D morphing parameter, and transforming the first 3D model into a second 3D model based on the 3D morphing parameter;

acquiring first 2D coordinates by mapping the first 3D model to a 2D space, and acquiring second 2D coordinates by mapping the second 3D model to the 2D space; and acquiring a second 2D image comprising a morphed target by morphing the target in the first 2D image based on the first 2D coordinates and the second 2D coordinates, wherein the processor is configured for acquiring the first 3D model of the target in the 3D space based on the first 2D image comprising the target by:

extracting, from the first 2D image through a Human Mesh Recovery (HMR) model, a first reconstruction parameter for reconstructing a 3D model of the target; and reconstructing the first 3D model of the target in the 3D space using the first reconstruction parameter as extracted, wherein the first reconstruction parameter comprises first joint point parameters of the target, wherein the processor is configured for:

extracting second joint point parameters of the target from the first 2D image through a human detection model, second joint points represented by the second joint point parameters coinciding with a part of first joint points represented by the first joint point parameters, wherein reconstructing the first 3D model of the target in the 3D space using the first reconstruction parameter as extracted comprises:

forming a second reconstruction parameter by replacing, with the second joint point parameters, the first joint point parameters of the part of the first joint points coinciding with the second joint points in the first reconstruction parameter; and reconstructing the first 3D model of the target in the 3D space based on the second reconstruction parameter.

10. The device of claim 9, wherein the processor is configured for acquiring the first 2D coordinates by mapping the first 3D model to the 2D space, and acquiring the second 2D coordinates by mapping the second 3D model to the 2D space by:

acquiring the first 2D coordinates and the second 2D coordinates by mapping the first 3D model and the second 3D model respectively to the 2D space according to a camera parameter of the first 2D image.

11. The device of claim 9, wherein the processor is configured for:

acquiring a first 2D morphing parameter of the first 2D image; and acquiring the 3D morphing parameter according to the first 2D morphing parameter and a mapping relation between the 2D space and the 3D space.

12. The device of claim 9, wherein the processor is configured for:

acquiring a contour point parameter of the target in the first 2D image;

determining, based on the contour point parameter, a connection relation between at least two contour points, as well as a morphing direction represented by the connection relation; and acquiring the second 2D image comprising the morphed target by morphing the target in the first 2D image along the morphing direction based on the first 2D coordinates and the second 2D coordinates.

13. The device of claim 12, wherein the processor is configured for determining, based on the contour point parameter, the connection relation between the at least two contour points, as well as the morphing direction represented by the connection relation by:

determining the morphing direction according to a first connection direction of contour points of at least two symmetrically distributed parts in the target based on the contour point parameter, the morphing direction comprising at least one of a first morphing direction parallel to the first connection direction or a second morphing direction perpendicular to the first connection direction.

14. The device of claim 9, wherein the processor is configured for transforming the first 3D model into the second 3D model based on the 3D morphing parameter by:

acquiring the second 3D model by changing coordinates of at least part of contour points of the first 3D model based on the 3D morphing parameter.

15. A non-transitory computer storage medium, having stored thereon computer-executable instructions which, when executed by a processor, implement:

acquiring a first three-dimensional (3D) model of a target in a 3D space based on a first two-dimensional (2D) image comprising the target;

acquiring a 3D morphing parameter, and transforming the first 3D model into a second 3D model based on the 3D morphing parameter;

acquiring first 2D coordinates by mapping the first 3D model to a 2D space, and acquiring second 2D coordinates by mapping the second 3D model to the 2D space; and acquiring a second 2D image comprising a morphed target by morphing the target in the first 2D image based on the first 2D coordinates and the second 2D coordinates, wherein acquiring the first 3D model of the target in the 3D space based on the first 2D image comprising the target comprises:

extracting, from the first 2D image through a Human Mesh Recovery (HMR) model, a first reconstruction parameter for reconstructing a 3D model of the target; and reconstructing the first 3D model of the target in the 3D space using the first reconstruction parameter as extracted, wherein the first reconstruction parameter comprises first joint point parameters of the target, wherein the computer-executable instructions, when executed by a processor, further implement:

extracting second joint point parameters of the target from the first 2D image through a human detection model, second joint points represented by the second joint point parameters coinciding with a part of first joint points represented by the first joint point parameters, wherein reconstructing the first 3D model of the target in the 3D space using the first reconstruction parameter as extracted comprises:

forming a second reconstruction parameter by replacing, with the second joint point parameters, the first joint point parameters of the part of the first joint points coinciding with the second joint points in the first reconstruction parameter; and reconstructing the first 3D model of the target in the 3D space based on the second reconstruction parameter.

* * * * *